Aug. 23, 1938.  H. P. SLEEPER  2,128,019
PHASE SEQUENCE AND VOLTAGE INDICATING MEANS
Filed Nov. 30, 1935  3 Sheets-Sheet 1
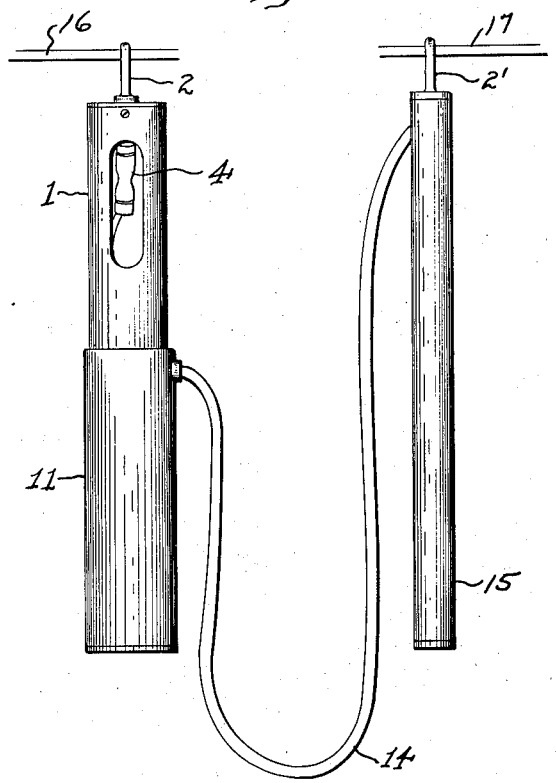
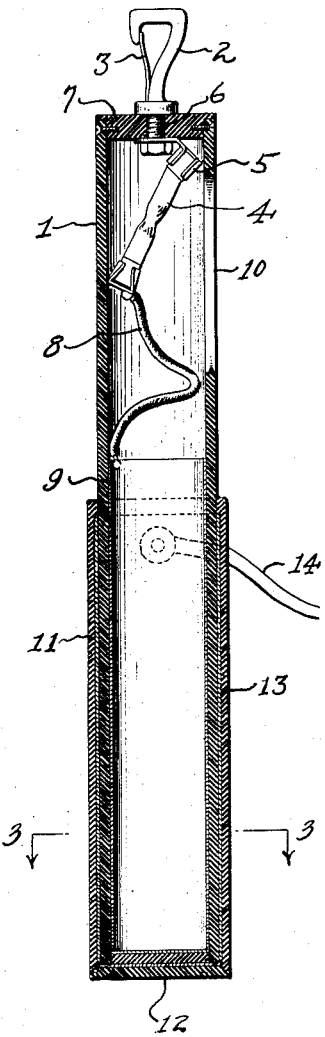
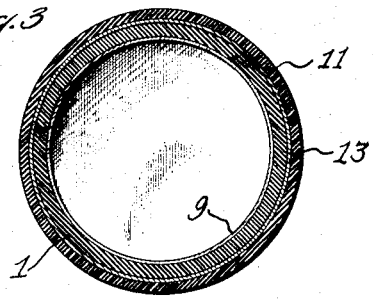
INVENTOR.
Harvey P. Sleeper,
BY
George D. Richards
ATTORNEY.

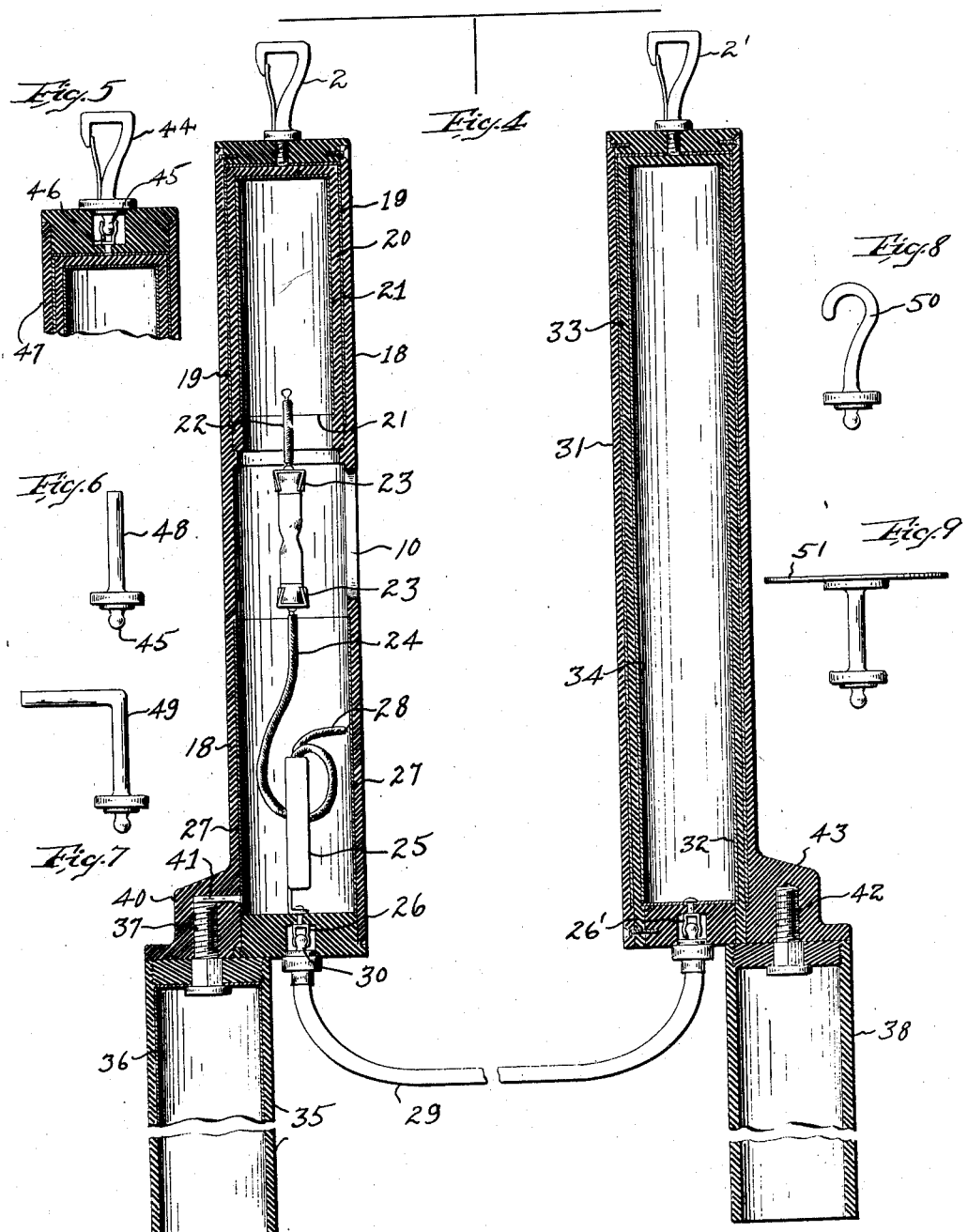

Aug. 23, 1938.                 H. P. SLEEPER                    2,128,019
              PHASE SEQUENCE AND VOLTAGE INDICATING MEANS
                    Filed Nov. 30, 1935          3 Sheets-Sheet 3
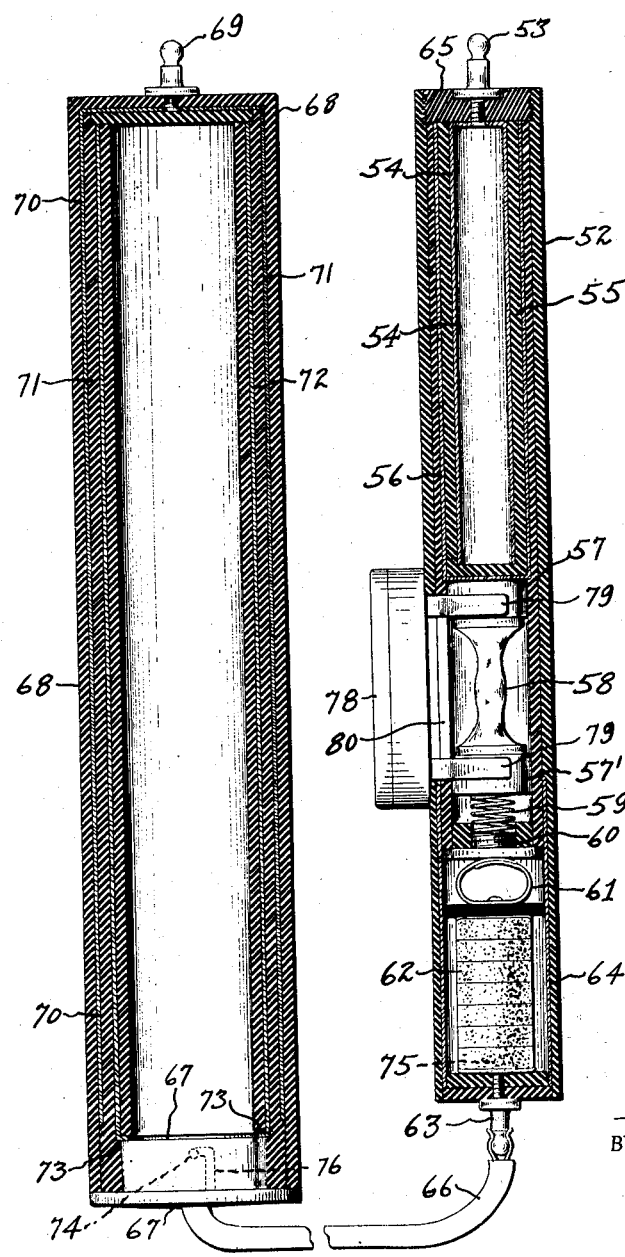
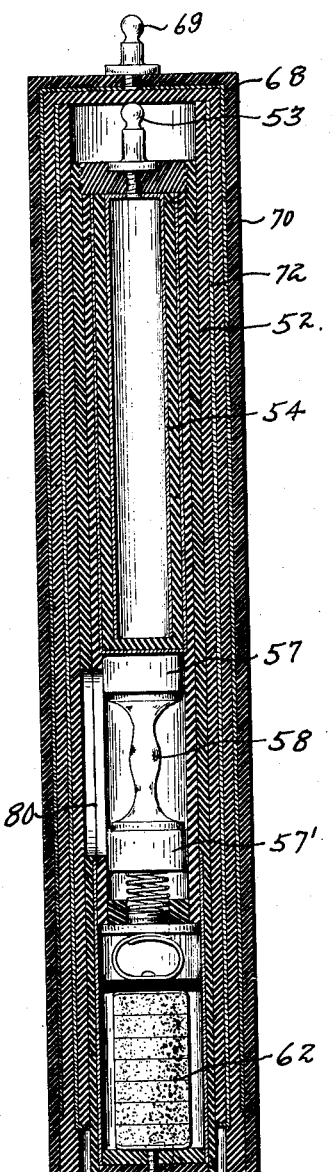
INVENTOR
Harvey P. Sleeper,
BY
George D. Richards
ATTORNEY.

Patented Aug. 23, 1938

2,128,019

UNITED STATES PATENT OFFICE 2,128,019

PHASE SEQUENCE AND VOLTAGE INDICATING MEANS

Harvey P. Sleeper, Short Hills, N. J.

Application November 30, 1935, Serial No. 52,302

8 Claims. (Cl. 172—245)

This invention relates, generally, to means for phasing electrical conductors as of transmission and distribution systems, and the invention has reference, more particularly, to a novel phasing device adapted for this purpose.

In the transmission and distribution of electric power it is often desirable, upon occasion, to connect one transmission or distribution system to another, as, for example, when a lead or leads of one line develop a fault it is desirable that the corresponding lead or leads of another line in the same system be connected for supplying power to the load of the faulty lead or leads. It is essential, however, that the leads so connected shall be of the same phase relation as those of the faulty lead or leads, for otherwise service will be disrupted.

The principal object of the present invention is to provide a novel phasing device for comparing the phases of A. C. leads, the said device serving to visually indicate whether or not any two leads are of the same or of different phases.

Another object of the present invention lies in the provision of a novel phasing device of the above character that is compact and light of weight, the same being adapted to be readily carried about by a lineman or other user, the said device being safe in use and easily applied to leads for determining whether or not they are of the same phase.

Still another object of the present invention is to provide a novel phasing device of the above character that is adapted for use in phasing leads over a wide range of voltages, the said device serving to also indicate if two leads which are in phase are of the same or different voltages, the said device being also adapted, when desired, for indicating whether or not a lead is alive.

Other objects of this invention, not at this time more particularly enumerated, will be clearly understood from the following detailed description of the same.

The invention is clearly illustrated in the accompanying drawings, in which:

Fig. 1 is a view in elevation of the novel phasing device of this invention, the same being shown applied to a pair of leads for determining if the latter are of the same phase.

Fig. 2 is an enlarged vertical sectional view of a portion of the structure of Fig. 1.

Fig. 3 is an enlarged sectional view taken along line 3—3 of Fig. 2 looking in the direction of the arrows.

Fig. 4 is a vertical sectional view of a somewhat modified form of the invention.

Fig. 5 is a fragmentary sectional view showing a removable electrode.

Figs. 6, 7, 8 and 9 show various forms of removable electrodes, and Figs. 10 and 11 show a modification of the invention.

Similar characters of reference are employed in said views, to indicate corresponding parts.

Referring now to Figs. 1 to 3, the reference numeral 1 designates a hollow cylindrical casing or housing of insulating material having a hook shaped electrode 2 at its upper end, the said electrode being shown as provided with a spring clip 3 for retaining the electrode upon a suitable support such as a lineman's belt, whereby the same may be carried from place to place conveniently. Within the hollow casing 1 is contained a short neon tube 4 that is adapted to have one end thereof connected as by a clip 5 to the electrode 2, which electrode is illustrated as having a threaded shank 6 projecting through the top 7 of casing 1 and to which shank the clip 5 is secured as by a nut. The other end of the neon tube 4 is connected as by lead 8 to a cylindrical condenser plate 9 which is conformably received within the lower interior of the housing 1. The housing 1 is illustrated as provided at its upper portion, opposite the neon tube 4, with a window 10 through which the tube 4 may be observed.

A second and somewhat shorter cylindrical housing or casing 11 has an open upper end for telescopically receiving the housing 1, the lower end 12 of housing 11 being preferably closed. The internal diameter of the second housing 11 is slightly larger than the external diameter of the housing 1 so that the latter will have a sliding fit within the former. Housing 11 is provided with an internal condenser plate 13 of cylindrical shape that is adapted to overlie the lower portion of housing 1 when the latter is telescoped into housing 11. Condenser plate 13 is connected as by lead 14 to a second electrode 2' which is similar in construction to the electrode 2. Preferably the electrode 2' is carried at the upper end of the insulating handle 15.

In use, the lineman or other person employing the device can conveniently carry the same from place to place by merely attaching the electrodes 2 and 2' to his belt, allowing the telescoped casings 1 and 11 and the handle 15 to hang down. When the lineman desires to test a pair of leads to determine their phase relation, he first grasps the casing 11 in one hand with the casing 1 telescoped therein and touches the electrode 2 against one lead, such as lead 16 in Fig. 1. If the lead is alive and of suitable voltage for operating the neon tube 4 the latter will glow due to the capacity to ground between condenser plates 9 and 13 and the user's hand. With electrode 2 against lead 16 he then touches electrode 2' against the other lead 17 and if the leads 16 and 17 are of the same phase and of substantially the same voltage the neon tube will stop glowing. This will be apparent when it is noted that in such case similar voltages of the same phase are applied to both ends of the neon tube.

If, however, the two leads 16 and 17 are not of the same phase the neon tube will glow much more brightly than when electrode 2 alone was touched against the lead 16, because with these leads at different phases an increased voltage is applied to the tube causing the same to glow more brightly. If it is merely desired to determine whether or not a lead is alive the housing 1 may be used alone, in which case the lower housing 11 may be removed and the lower portion of casing 1 held in the user's hand. In this case when the electrode 2 is touched against a lead, if the same is alive, the capacity provided by the user's hand and by the condenser plate 9 serves to pass enough capacity current for illuminating the tube 4, thereby indicating the live nature of the lead.

In the form of the invention shown in Fig. 4, a cylindrical insulating housing or casing 18 is provided having an electrode 2 at its upper end that is connected to a cylindrical condenser plate 19 within the upper portion of the housing 18. Insulation 20 separates the condenser plate 19 from a cooperating cylindrical condenser plate 21 also contained within housing 18. Condenser plate 21 is connected as by lead 22 to a clip 23 removably attached to one end of a neon tube 4, the other end of which tube is attached as by another clip 23 to a clip 24 connected to one end of a protective resistor 25 contained within the lower portion of housing 18. The other end of the resistor 25 is electrically connected to a terminal clip 26. A cylindrical condenser plate 27 is contained within the lower portion of housing 18 and is connected as by lead 28 to the lead 24. An outside lead 29 is detachably connected at one end as by a ball joint 30 to the clip 26 and is similarly connected at its other end to a clip 26' that is connected to the lower end of another cylindrical condenser plate 32 contained within the hollow interior of an insulating casing 31. Insulation 33 separates condenser plate 32 from the cooperating cylindrical condenser plate 34 that is electrically connected to an electrode 2' at the top of casing 31.

The apparatus of Fig. 4 is used in much the same manner as that of Fig. 1. Thus, in order to determine if two leads are of the same phase, the lineman will first grasp the lower portion of casing 18 in his hand and touch electrode 2 against one lead and if the lead is alive and of suitable voltage the tube 4 will glow and be seen through the aperture 10 in casing 18 due to the capacity to ground between the condenser plate 27 and the lineman's hand. While holding electrode 2 against the first lead he then grasps casing 31 and holds electrode 2' thereof against the other lead and if the leads are of the same phase the neon tube 4 will go out. Owing to the great amount of insulation in this form of the invention the same is very safe and may be used for extremely high voltages. Thus, it will be noted that insulation 20 is used between electrode 2 and neon tube 4, and that additional insulation is used between electrode 2' and terminal 26' of insulating housing 31.

When testing high tension leads it is often necessary to reach a considerable distance, in which case removable handles 35 and 38 may be attached to the casings 18 and 31. Handle 35 is illustrated as having a condenser plate 36 in its upper portion, which condenser plate is shown connected to a threaded stud 37 that is fixed in the upper portion of handle 35 and projects upwardly therefrom for threading into a threaded socket provided in a projection 40 formed on casing 18. With stud 37 threaded into projection 40, the upper end of this stud will abut a jumper lead 41 connected to the condenser plate 27. Handle 38 is a plain insulating handle having a threaded stud 42 at its upper end for threading into a boss 43 provided on casing 31. With the handles 35 and 38 attached to casing 18 and 31, the operator may reach a considerable distance inasmuch as these handles may be as long as 16 or 18 feet. When it is desired to merely determine if a lead is alive, the casing 18 may be used alone and lead 29 may be disconnected therefrom. When this casing is thus used alone and held in the hand the capacity between the hand and condenser plate 27 connected through lead 28 to the neon tube serves to illuminate tube 4, and when the handle 35 is used the additional capacity to ground provided by condenser plate 36 serves to better illuminate tube 4 provided, of course, that the lead is alive.

If desired, the electrodes 2 and 2' may be removably attached to their casings, whereby such electrodes may be interchangeable with other electrodes as shown in Fig. 5. In this figure the electrode 44 is provided with a male ball joint 45 for cooperating with a female socket 46 carried by the casing 47 which may be any one of the casings heretofore described. Figs. 6, 7, 8 and 9 show various electrodes which may be exchanged for electrode 44 of Fig. 5. Different classes of work require different types of electrodes including the straight electrode 48 of Fig. 6, the angular electrode 49 of Fig. 7, the hooked electrode 50 of Fig. 8 and the condenser plate type of electrode 51 of Fig. 9, this latter electrode being suitable for use with insulated conductors.

The form of invention shown in Figs. 10 and 11 is very similar to that shown in Fig. 4 with the exception that means is provided for inserting or telescoping one casing into the other, thereby providing a compact article for carrying about. In these figures, a casing 52 is shown provided with a ball type electrode 53 connected to a condenser plate 54 that is insulated by insulation 55 from another condenser plate 56 engaging one cylindrical terminal 57 of neon tube 58. The other cylindrical terminal 57' of neon tube 58 is electrically connected through a spring 59, plug 60 and spring contact 61 to one end of a carbon pile resistance 62. The other end of resistance 62 is connected to the electrode 63, also shown as of the ball type. A condenser plate 64 within the lower portion of housing 52 is connected to neon tube 58 through metal plug 60. Casing 52 has a removable threaded plug 65 in its upper portion carrying the electrode 53. By unscrewing plug 65 the assembly including condenser plates 54 and 56 may be removed, thereby enabling neon tube 58 to also be removed, as for purposes of replacement.

Electrode 63 is adapted to be connected by removable lead 66 to a metallic plug 67 provided in the lower portion of an insulating casing 68.

Insulating casing 68 has an upper electrode 69 connected to condenser plate 70 that is insulated by sleeve insulation 71 from a second condenser plate 72 having a lower flange 73 for abutting the top of plug 67. Plug 67 is adapted to be retained in casing 68 by a bayonet joint 74. The internal diameter of casing assembly 68 is made slightly larger than the external diameter of casing 52, whereby upon removing plug 67, casing 52 may be slid into the hollow casing 68 as illustrated in Fig. 11. Preferably casing 52 is provided with pins 75 for engaging the bayonet slot 76 provided in the interior wall of casing 68, thereby retaining the casing 52 within casing 68 as long as desired.

In use, to determine if two leads are of the same or of different phases electrode 53 is first touched against one lead, which if alive, will illuminate tube 58 and then electrode 69 is touched against the remaining lead and if the latter is of the same phase and voltage as the former the tube 58 will go out. The casing 52 may be held alone when testing to see if a lead is alive, the condenser 64 connected through plug 60 to the neon tube serving to illuminate the latter.

Sometimes two leads will be of the same phase but of somewhat different voltage and in such case it may be desirable to detect such difference in voltage and to quantitatively measure the same. To do this I provide a micro-ammeter 78 which may be calibrated directly in volts. This instrument may be provided with a built-in rectifier as is well known to those skilled in the art. C-clips 79 are secured to the back of the micro-ammeter 78 and may be inserted through the window 80 for slipping upon the metallic terminals 57 and 57' of an insulating or nonconducting evacuated tube having the same location and appearance as neon tube 58, the latter tube being replaced by the insulation tube which acts to shunt current through meter 78, whereby in use, the instrument 78 will be actuated by the voltage difference between the two leads, one of which engages electrode 53 and the other of which engages electrode 69. By providing electrodes of the ball type the same may be used for receiving other types of electrodes such as those shown in Figs. 5 to 9, these latter electrodes being provided with female sockets for attaching to the electrodes 53 and 69.

By using the novel phasing device of this invention a lineman may readily determine the phase of leads of adjacent or intersecting transmission or distribution lines and is thereby enabled to provide for the proper switching of corresponding leads of the lines together in the event of a fault occurring on one or more leads of one or the other of the lines.

When using the forms of the invention shown in Figs. 4 to 11, in practice it is found that the two condensers with the neon tube therebetween set up high frequency oscillations at the peaks of the power voltage wave, thereby greatly enhancing the glow of the neon tube and enabling the use of relatively small and inexpensive condensers while at the same time causing the neon tube to respond to lower voltages on the power line, whereby the range of use of the device is greatly enlarged.

As many changes could be made in the above construction and many apparently widely different embodiments of this invention could be made without departing from the scope thereof, as defined by the following claims, it is intended that all matter contained in the above description or shown in the accompanying drawings shall be interpreted as illustrative and not in a limiting sense.

I claim:

1. In a phase sequence and voltage indicating device of the character described, an insulating member having an electrode adapted to be applied to a power lead, a neon tube carried by said member, said electrode being electrically connected to one terminal of said neon tube, a second insulating member also having an electrode, said second electrode being adapted for connection to a second power lead and an electrical connection between the electrode of said second insulating member and the other terminal of said neon tube, said electrical connection including a flexible lead and condenser plates with insulation therebetween.

2. In a phase sequence and voltage indicating device of the character described, an insulating member having an electrode adapted to be applied to a power lead, a neon tube carried by said member, said electrode being electrically connected to one terminal of said neon tube, a second insulating member relatively movable with respect to said first member and having an electrode electrically connected to the other terminal of said neon tube, the second electrode being adapted for connection to a second power lead and condenser means included in the connections between said electrodes and said tube terminals, whereby direct current flow to said tube is prohibited.

3. In a phase sequence and voltage indicating device of the character described, an apertured cylindrical insulating casing having an electrode projecting from its upper end, a neon tube contained within said casing and visible through the aperture thereof, a condenser plate within the lower portion of said casing, electrical connections between the terminals of said neon tube and said electrode and condenser plate respectively, a second cylindrical casing arranged for telescoping upon the lower portion of said first named casing, a condenser plate within said second casing for coacting with said first named condenser plate, and a relatively movable electrode connected to said second named condenser plate.

4. In a phase sequence and voltage indicating device of the character described, an insulating housing having an electrode thereon, a neon tube within said housing, means including a condenser interconnecting one terminal of said neon tube with said electrode, a second insulating housing having an electrode thereon, a condenser within said second insulating housing having one side thereof connected to said second named electrode, means including a flexible connector, and a series connected resistor for connecting the other side of said second named condenser to the remaining terminal of said neon tube.

5. In a phase sequence and voltage indicating device of the character described, an insulating housing having an electrode thereon, a neon tube within said housing, means including a condenser interconnecting one terminal of said neon tube with said electrode, a second insulating housing having an electrode thereon, a condenser within said second insulating housing having one side thereof connected to said second named electrode, means including a removable flexible connector for connecting the other side of said last named condenser to the remaining terminal of said neon tube, said second insulating housing being constructed and arranged for telescopically receiving said first named insulating housing.

6. In a device of the character described, an apertured cylindrical insulating casing having an electrode projecting from its upper end, a neon tube contained within said casing and visible through the aperture thereof, a condenser plate within the lower portion of said casing, electrical connections between the terminals of said neon tube and said electrode and condenser plate respectively, and a second insulating casing having a condenser plate therein, said second insulating casing being arranged for telescoping over the lower portion of said first named casing.

7. In a device of the character described, an insulating casing having an electrode, a neon tube within said casing, said neon tube having one terminal thereof connected to said electrode, a capacity element within said casing and connected to the other terminal of said neon tube, and a second capacity element arranged for detachable connection to said casing, said second capacity element serving, when attached to said casing to cooperate with said first capacity element to complete a capacity coupling for said neon tube.

8. In a device of the character described, an insulating casing having an electrode thereon, a second electrode movable with respect to said casing, potential indicating means carried by said casing, and including condenser connections for electrically coupling the respective terminals of said indicating means to said respective electrodes.

HARVEY P. SLEEPER.